United States Patent Office 3,655,712
Patented Apr. 11, 1972

3,655,712
EQUILIBRATED ORGANO-POLYSILOXANE MIXTURES WITH TERMINAL SULFURIC ACID GROUPS AND PROCESS FOR THEIR PREPARATION
Gerd Rossmy, Essen-Werden, Germany, assignor to Th. Goldschmidt A.G., Essen, Germany
No Drawing. Filed Jan. 28, 1970, Ser. No. 6,547
Int. Cl. C07f 7/02
U.S. Cl. 260—448.2 N       60 Claims

ABSTRACT OF THE DISCLOSURE

A linear equilibrated organo-polysiloxane mixture having terminal sulfuric acid groups of the general formula

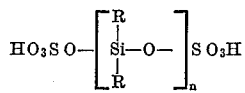

I wherein $n=2$ to 20 and R is hydrocarbon which may be substituted by a group inert in respect to sulfuric acid. A portion of the hydrocarbon groups R may be replaced by the group

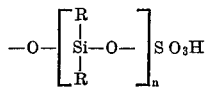

V

The application also discloses a process for the preparation of such equilibrated organo-polysiloxane mixtures which are in equilibrium with sulfuric acid and cyclic compounds of the general formula

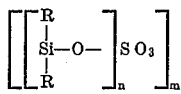

II wherein R and $n$ have the above meaning, $m$ being 1–10. If a portion of the R groups of Formula I is replaced by groups of Formula V, then two of the Formula V groups may form the group

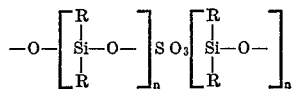

IX on that side of the equilibrium which contains the Formula II compounds and the free sulfuric acid. The novel mixtures are useful as equilibration catalysts for organopolysiloxanes. They may also successfully be employed as impregnation agents for imparting various materials such as glass, textiles, and the like with water repellent characteristics.

FIELD OF THE INVENTION

The invention relates to novel, predominantly linear, equilibrated organo-polysiloxane mixtures having terminal sulfuric acid groups and processes for their manufacture.

BACKGROUND OF THE INVENTION AND PRIOR ART

Sulfuric acid derivatives of organo-halosilanes have previously been described in the chemical literature. Such organo-silyl sulfates may be prepared according to different processes. It has thus been proposed to prepare such compounds by the action of sulfuric acid on trimethylchlorosilane according to the following reaction scheme

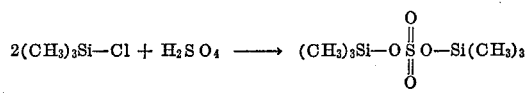

Further, polysiloxanes with intramolecularly bound sulfate groups have been described. Examples for such compounds are disclosed in U.S. Patent 3,115,512, wherein the polysiloxanes additionally contain halogen or alkoxy groups.

It has been known for a long time that organopolysiloxanes can be equilibrated with sulfuric acid. In attempting to explain the kinetics of the equilibration reaction, the occurrence of compounds containing $\equiv$SiOSO$_3$H groups has been assumed. Some researches have also indulged in the conjecture that the equilibration reaction results in the formation of intermediate compounds of the formula

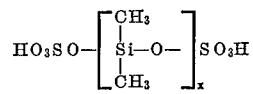

wherein $x$ is a small whole number. However, it has not been possible to demonstrate the existence of these compounds with certainty. Further, it is obvious that such compounds, if they actually are formed, could conceivably be present in very small amounts in a mixture which contains predominantly sulfuric acid ester-free organo-polysiloxanes. In no instance has it been possible to isolate or recover such compounds.

SUMMARY OF THE INVENTION

In view of the above it is surprising that it has been found possible in accordance with this invention to prepare predominantly linear equilibrated organo-polysiloxane mixtures having terminal sulfuric acid groups of the following formula

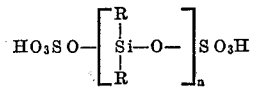

I

In this formula $n=2$ to 20 and R is hydrocarbon which, if desired, may be substituted by a group inert in respect to sulfuric acid. Further, a portion of the hydrocarbon groups R may be replaced by the group

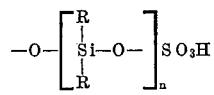

V

The mixtures are in equilibrium with sulfuric acid and cyclic compounds of the general formula

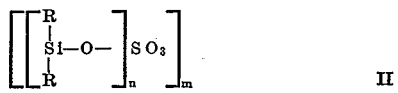
II wherein R has the above meaning and $m=1$ to 10, preferably 1 or 2.

If a portion of the R groups of Formula I is replaced by Formula V groups, then, in establishing the equilibrium condition, two of the Formula V groups may condense under sulfuric acid splitting to form the group

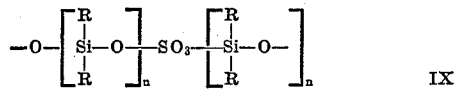
IX on that side of the equilibrium which contains the free sulfuric acid and the Formula II compounds. This condensation may occur inter- or intramolecularly.

These mixtures are, in accordance with this invention, prepared pursuant to one of the following three alternative procedures:

(a) Organo-polysiloxanes containing structural units of the general formula

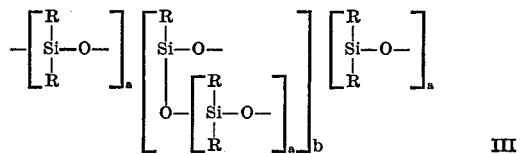
III are reacted with $H_2S_2O_7$ in quantities, calculated on the siloxane linkages of $10^{-5}$ to $5\cdot 10^{-1}$ mol. In the above Formula III R stands for hydrocarbon which may be substituted by a group inert to sulfuric acid; $b=0$ to 20; if $b=0$ then $a=1$ to $10^5$; however, if $b\geq 1$ then $a=1$ to 20. The reaction may be carried out at elevated temperatures up to 150° C. It is preferred if the siloxane is added to the pyrosulfuric acid and not vice versa.

According to the second mode of operation the mixtures are prepared as follows:

(b) The above-mentioned organo-polysiloxanes III are reacted with sulfuric acid in quantities, calculated on the siloxane linkages, of $10^{-3}$ to 1 mol, preferably at slightly elevated temperatures and the formed reaction water is removed azeotropically wth low boiling inert solvents or under vacuum conditions or by means of an inert gas flow. The siloxane is preferably added to the sulfuric acid and not vice versa.

According to the third alternative the procedure is carried out as follows:

(c) Organo-halopolysiloxanes of the general formula

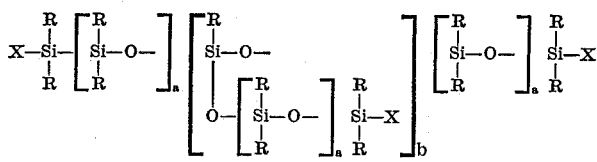

are reacted with sulfuric acid in quantities of 1 to 1.1 mole $H_2SO_4/SiX$ group, preferably at elevated temperatures up to 150° C. In this procedure the sulfuric acid is preferably added to the organo-halopolysiloxanes. In the above Formula X stands for halogen, preferably chlorine or bromine. The organo-halopolysiloxanes of the formula may also contain

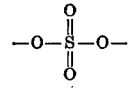

groups which link two silicon atoms.

The compounds obtained according to alternative a, b or c may be reacted with dialkylcyclopolysiloxanes, if desired at elevated temperatures up to 150° C.

The compounds, prepared in accordance with the invention and having the formula

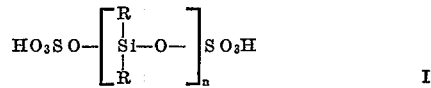
I are then in equilibrium with compounds of the formula

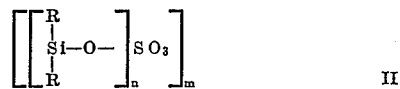
II and with sulfuric acid, $m$ having a value of 1 to 10, preferably 1 or 2. This equilibrium may be represented by the following reaction scheme

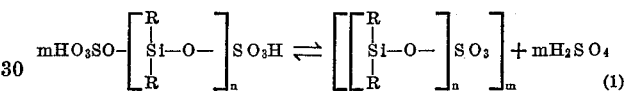
(1)

It will be obvious for a person skilled in this specialized art that the product may conceivably contain small equilibrium contents of dialkylcyclopolysiloxanes.

If, in respect to the compound of Formula I, a portion of the groups R is replaced by the group

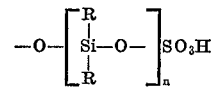

then, in respect to the corresponding products of Formula II always two of these groups may be replaced by the group

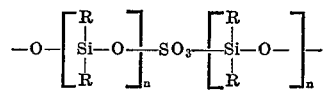

It should be emphasized that the compounds of the Formulas I and II are always mixtures of polymerhomologues which are in equilibrium in respect to the molecular weight and the structural distribution. In respect to the frequency maximum, it should be noted that the values for the index $n$ as appearing in the formulas for the linear and the cyclic compounds need not coincide. The cyclic polydialkylsiloxanylsulfates have thus predominantly $n$-values of 2 to 10 and $m$-values of 1 and 2. Chainlike polydialkylsiloxanes with $SO_3H$ groups in $\alpha$- and $\omega$-position may, however, have $n$-values as high as several thousands.

It has already been stated that the meaning of the symbol R is that of a hydrocarbon which, however, if desired, may be substituted by a group inert in respect to sulfuric acid. If one disregards that a portion of the hydrocarbon groups R may be replaced by the group

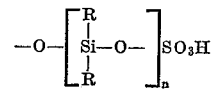

then the following explanatory meaning can be attributed to the R group: The group R may have the same or different meaning within the polysiloxane mixture and thus also within the same molecule. The group R is preferably alkyl, the lower alkyl groups of 1 to 6 carbon atoms being particularly preferred. Of special preference are methyl and ethyl. A portion of the R groups may within the polymer mixture, also have the meaning of aryl in which, if desired, a hydrogen atom may be replaced by a SO₃H group. In the event that R stands for a substituted hydrocarbon, care should be taken that a substituent is chosen which does not react with sulfuric acid. A selective number of examples for such substituted R groups are the groups —(CH₂)₃OSO₃SiR₃; —(CH₂)₃OSO₃H; —(CH₂)₃SO₃H; —CH₂Br; —(CH₂)₃Cl; —(CH)₂OR; —(CH₂)ₓR_f(R_f= Perfluoroalkyl); x=whole number; —(CH₂)₃OR_f.

These compounds, which in respect to their gross composition may be represented by the general Formula I, correspond, for example, to the following more specific structure

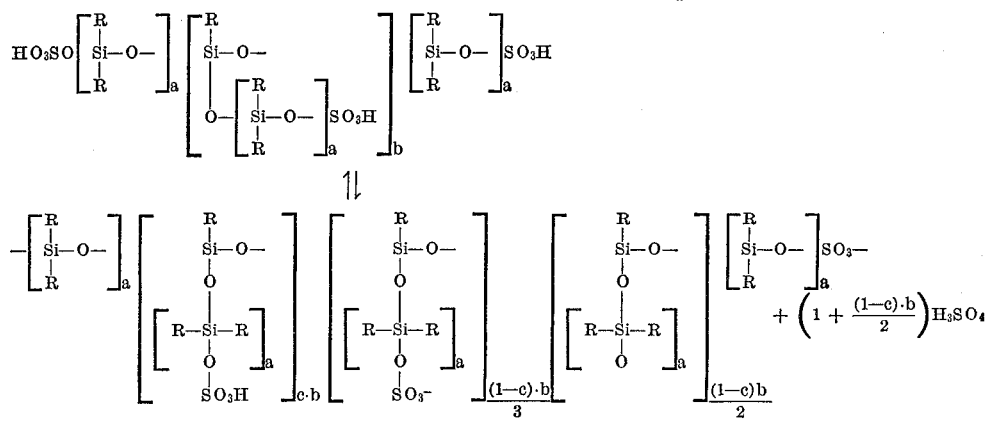

On the right hand side of the equilibrium in the formula, the residual valences are saturated under formation of silicon-oxygen-sulfur linkages in intra- or intermolecular manner. The index $b$ has then a value of from 0 to 20, preferably 0 to 5. If $b=0$ then $a$ has a value of from 1 to $10^5$. By contrast, if $b\geq 1$ then $a$ has a value of 1 to 20, preferably of from 1 to 10. $c$ has a value of from 0 to 1.

Examples of species which are present in these mixtures are the following:

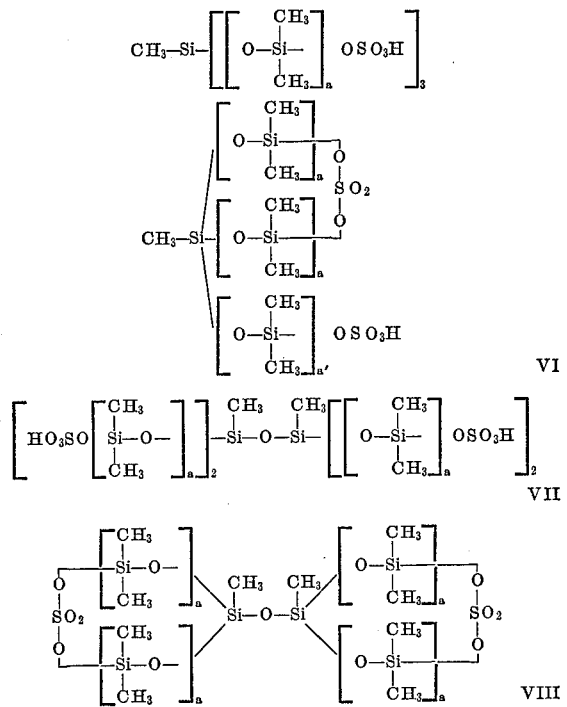

In the above specific examples or species, $a$ and $a'$ have the same meaning; however, they need not have identical numerical values.

It will be noted that Formula VI represents a compound wherein R has been replaced by the group

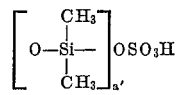

to wit, a Formula V group. However, this group has not formed a Formula IX group by intermolecular condensation with sulfuric acid splitting off. In the compound of Formula VII, two R groups have been replaced by Formula V groups, again without formation of Formula IX groups. By contrast, in the compound of Formula VIII, the Formula V groups of compound VII have formed a Formula IX group, to wit, intramolecular ring formation has taken place.

The novel equilibrated organo-polysiloxane mixtures with terminal sulfuric acid groups of Formula I may, as stated before, be prepared by different procedures.

According to a preferred procedure, the mixture are prepared according to alternative $a$ above in which organo-polysiloxanes with structural units of the general formula

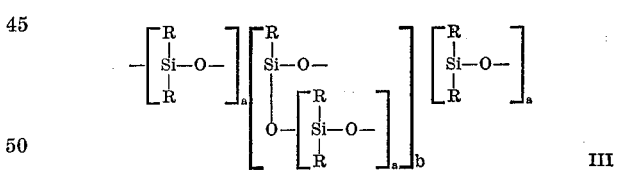

wherein $a$, $b$ and R have the above meaning, are reacted with $H_2S_2O_7$ in quantities which, calculated on the siloxane linkages, are $10^{-5}$ to $5\cdot 10^{-1}$ mol. The reaction is preferably carried out at elevated temperatures up to 150° C. It is preferred if the siloxane is added to the pyrosulfuric acid and not vice versa. The residual valences in the Formula III become saturated, preferably intramolecularly, under formation of SiOSi linkages or the residual valences are occupied by endblocking groups. Examples for such endblocking groups whose influence on the constitution of the final products is negligible are hydroxyl-, alkoxy-, acyloxy-, trialkylsiloxy-, halogen-, particularly Cl or Br. It is preferred to use such organo-polysiloxanes which have a cyclic structure and wherein $a=1.5$ and $b=0$. Further, cyclopolysiloxane-containing hydrolysates of dialkylchlorosilanes and commercially available dialkylpolysiloxanes are suitable for the intended purpose.

The reaction temperature is not critical. However, with a view to avoiding secondary reactions, the temperature should not exceed 150° C. A temperature range of from 10 to 70° C. is preferred. The reaction is preferably performed in such a manner that the siloxane is added to the pyrosulfuric acid $H_2S_2O_7$ in dropwise manner. The reaction then proceeds according to the following scheme:

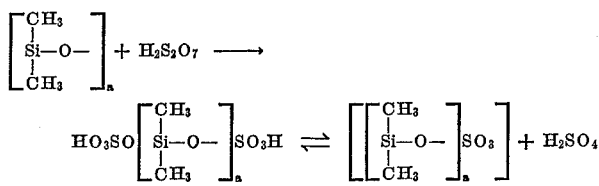

Instead of using pyrosulfuric acid proper, mixtures of $SO_3$ and $H_2SO_4$ can be used. If the composition of the mixture deviates from the gross composition $H_2S_2O_7$ and if there is an excess of sulfuric acid, it is advantageous to remove the reaction water, which is then formed, from the reaction mixture. This is advantageously carried out by azeotropic distillation, under vacuum conditions or by passing an inert gas flow through the system.

According to the second preferred embodiment for preparing the inventive compounds, to wit the embodiment previously indicated by $b$, organo-polysiloxanes of the Formula III are reacted with sulfuric acid in quantities, calculated on the siloxane linkages, of $10^{-3}$ to 1 mol at slightly elevated temperatures. Again, the formed reaction water is azeotropically removed with low boiling inert solvents. The removal of the water may also be accomplished under vacuum conditions or by passing an inert gas flow through the system. The siloxane should preferably be added to the sulfuric acid and not vice versa.

Dichloromethane is a suitable solvent for the azeotropic distillation referred to. The preferred temperature range is about 20 to 70° C. Also in this embodiment it has been found to be advantageous to add the siloxane to the sulfuric acid. According to the third preferred mode of operation, previously indicated as alternative $c$, organo-halopolysiloxanes of the general formula

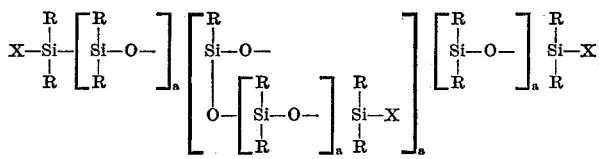

are reacted with sulfuric acid in quantities of 1 to 1.1 mole $H_2SO_4/SiX$ group. The reaction is preferably carried out at elevated temperatures up to 150° C., the sulfuric acid preferably being added to the organo-halogenpolysiloxane and not vice versa. In the formula, X stands for the halogen group and is preferably chlorine or bromine. The organo-halogenpolysiloxanes of the above formula may, if desired, contain

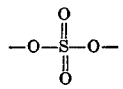

groups which connect two Si atoms.

Contrary to the embodiment of alternative $b$, essentially no siloxane linkages are split in the latter mode of operation. Merely a substitution of the terminal group takes place. If organo-halogenpolysiloxanes are used which already contain $SO_4$ groups in intramolecularly bound manner, and which are already present in equilibrated form, then the reaction proceeds particularly readily. As in the other alternative, the reaction temperature is not of particular importance. However, temperatures above 150° C. should be avoided in order to prevent the formation of by-products. Excellent results are obtained if the reaction is carried out within a temperature range of about 20 to 100° C.

The hydrogen halide which is liberated during the reaction may be removed from the reaction mixture by reducing the pressure or by passing an inert gas through the system. Contrary to the previously described embodiments it is recommended in the present procedure to add the sulfuric acid to the siloxane in small portions.

The compounds which are prepared in accordance with the three alternatives explained above may thereafter be reacted with dialkylcyclopolysiloxanes which results in an extension of the polysiloxane chains. In other words, the index $n$ or $a$ is enlarged by such reaction. For this purpose it is recommended to use starting compounds with $a$ values of 1 to 10, particularly 1 to 5, and a $b$ value of 0. The quantity ratio of the dialkylcyclopolysiloxane to be incorporated is then dependent on the final value of $a$. Preferably cyclic polysiloxanes are used in the form of dimethylpolysiloxanes of 3 to 10 dimethylsiloxy units in the ring. The cyclopolysiloxane is incorporated into the sulfate group containing siloxane without the additional use of an equilibration catalyst. The equilibration reaction proceeds in respect to temperature without having to maintain any particular conditions. Preferably the equilibration reaction is carried out at temperatures below 150° C. A preferred temperature range is 15 to 70° C.

The novel equilibrated organo-polysiloxane mixtures with terminal sulfuric acid groups possess utility for several purposes. They are thus exceedingly effective equilibration catalysts for organo-polysiloxanes. Thus, for example, they may be used for the production of silicone oils and highly viscous organo-polysiloxanes with terminal hydroxyl groups. As compared to the known equilibration catalysts such as sulfuric acid and organo-silylsulfate, the inventive novel compounds have the advantage that they are soluble in the system to be equilibrated and that the equilibration reaction proceeds at such a speed that a continuous procedure is rendered possible. The novel compounds permit equilibration reactions which lead to products of higher viscosity. With particular success are used as catalysts those products which after their preparation have been reacted with dialkylcyclopolysiloxanes so as to extend the chain length in the manner previously described.

The inventive novel compounds are moreover suitable as impregnation agents in order to impart certain materials such as glass, ceramic material, textiles and paper with water repellent properties. An advantage of the novel compounds is their superior surface adhesion. If they are used as impregnating agents, the terminal sulfuric acid groups and the small amount of sulfuric acid which is present in equilibrium can be neutralized with corresponding bases such as calcium hydroxide, calcium oxide, zinc oxide, alkalimetal carbonates, alkaline earthmetal carbonates or amines.

The preparation of the novel compounds or mixtures by means of the procedures generally explained hereinabove will now be explained more specifically by way of several examples.

It will be appreciated, however, that these examples are given by way of illustration and not by way of limitation and that changes may be effected without affecting in any way the scope and spirit of the invention as recited in the appended claims.

Example 1

This example is concerned with the mode of operation previously indicated as (a).

One mole of $H_2S_2O_7$ is introduced into a three neck flask fitted with stirrer. One mole of octamethylcyclotetrasiloxane is added in dropwise manner to the $H_2S_2O_7$. The temperature is maintained at 15° C. by water cooling. The reaction product thus formed, which is obtained without any loss of weight, is slightly opaque. No sulfuric acid phase separated. The viscosity of the product at 20° C. is 276 cp. The acid value, which was ascertained by hydrolysis, amounted to $8.35 \cdot 10^{-3}$ val. acid 1 gram substance. The theoretical acid value of the compound

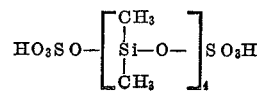

is 8.43·10⁻³ val. acid 1 g. substance. The presence of an equilibrium mixture corresponding to the reaction scheme 1, given hereinabove, can be demonstrated by mixing the reaction product with dichloromethane: the insoluble sulfuric acid, which thus is removable from the equilibrium condition, then separates as a separate second phase.

The constitution of the reaction product, particularly the presence of the equilibrium in relation to the polymer distribution, is determined by reaction with methanol-triethylamine. In doing so all SiOS linkages are split under the formation of SiOCH₃ linkages. Side reactions could hardly be observed. The obtained α,ω dimethylpolydimethylsiloxane can be distilled at a bath temperature of up to 300° C. and a vacuum of 10⁻² mm. Hg without any residue remaining in the reaction vessel. The content of the individual species or units

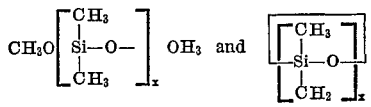

was determined in gas chromatographic manner. The areal proportions of the individual linear and cyclic siloxanes are indicated in the following Table I at the registration curve of the gas chromatograph:

TABLE I

| Number of Si-atoms in siloxane: | Areal proportion in percent | |
|---|---|---|
| | Linear | Cyclic |
| 1 | 0.8 | |
| 2 | 5.6 | |
| 3 | 20.8 | 0.5 |
| 4 | 17.0 | 2.9 |
| 5 | 18.1 | 0.5 |
| 6 | 12.1 | <0.1 |
| 7 | 8.3 | |
| 8 | 5.8 | |
| 9 | 3.1 | |
| 10 | 2.0 | |
| 12 | 0.7 | |
| 13 | 0.5 | |

Example 2

This example deals with the reaction of the reaction product of Example 1 with cyclic polysiloxane.

The reaction product obtained according to Example 1 is admixed at room temperature with additional octamethylcyclotetrasiloxane in an amount so that per sulfur atom 22 Si-atoms are present in the reaction mixture. The reaction mass becomes more viscous and is homogeneous and exhibits a very slight turbidity only. The acid value which is determined by hydrolysis amounts to 1.165·10⁻³ val. acid per gram substance. The theoretical acid value for the compound

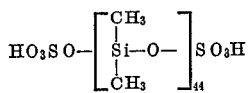

amounts to 1.162·10⁻³ val. per gram substance. After methoxylation, it was ascertained gas chromatographically that only 4.8% of octamethylcyclotetrasiloxane was still contained in the reaction mixture. This corresponds very well to the expected value for an equilibrated, long chain dimethylsiloxane system. Short chain, α,ω-dimethylpolydimethylsiloxane with 3 to 13 dimethylsiloxy units are in each case present in an amount of less than 0.75%. These polysiloxanes presumably emanate from the species

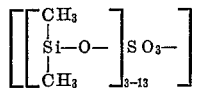

which are present in the equilibrium system. A flat relative maximum with compounds of 4 to 5 Si units indicates that these ring sizes are preferred to a certain extent.

The addition of octamethylcyclotetrasiloxane is then continued until the silicon-sulfur ratio has increased to 60. The viscosity of this product amounts to 134.600 cp. at 20° C. The presence of octamethylcyclotetrasiloxane can still be ascertained in the mixture gas-chromatographically but the amount has decreased to about 5%. By hydrolysis of the reaction product, an α,ω-dihydroxypolydimethylsiloxane is recovered which is particularly suitable for the production of an elastomer system curable under cold condition.

Example 3

This example is concerned with the mode of operation previously indicated as (c).

Corresponding to U.S. Patent 3,115,512 an equilibrated chloropolysiloxanylsulfate of the formula

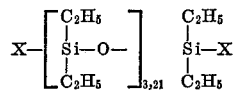

is prepared from diethyldichlorosilane and sulfuric acid and water in an amount insufficient for complete hydrolysis. In this Formula X stands for —Cl or —SO₄/2. The sulfate content of the product amounts to 6.7 g. per mol. An acid value of 4.104·10⁻³ val. per gram substance was ascertained by hydrolysis.

58 g. of this siloxane were gradually admixed with 23 g. of 100% sulfuric acid at room temperature. This corresponds to a ratio of 1.02 mol sulfuric acid per val. Cl. After complete addition of the sulfuric acid, the mixture was heated for several hours at 50° C. The liberated HCl was subsequently completely expelled by heating to 100° C. for about half an hour and subsequent treatment under vacuum at 30° C. and 20 mm. Hg. 1.7 g. of a lower phase separated. The upper phase (69.8 g.) has an acid value of 6.297·10⁻³ val. per gram substance and a chlorine content of 0.006·10⁻³ val. per gram substance. The theoretical acid value of 6.58·10⁻³ can be calculated for the compound

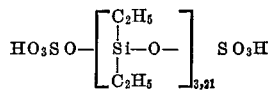

Corresponding to Example 2 the compound was methoxylated and the polymer distribution was ascertained gas-chromatographically. The values are indicated in Table II:

TABLE II

| Number of Si-atoms in siloxane: | Areal proportion in percent | |
|---|---|---|
| | Linear | Cyclic |
| 1 | 0.44 | |
| 2 | 11.12 | |
| 3 | 29.55 | 4.5 |
| 4 | 19.85 | 2.18 |
| 5 | 10.80 | 2.16 |
| 6 | 4.49 | 1.36 |
| 7 | 1.64 | 1.03 |

The content of higher and non-identifiable byproducts amounted to 10.87%.

Example 4

This example deals with the mode of operation previously indicated as alternative (c).

400 g. of a siloxane of the formula

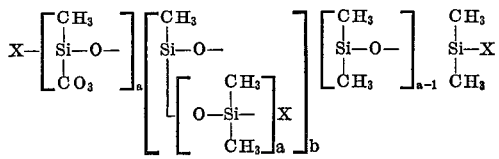

were stirred with 64 g. of sulfuric acid for one hour at 20° C. whereupon the stirring was continued for 20 hours at 50° C. In the above formula $a = 6.17$
$b = 3$ and $X = Cl$ or $—SO_{4/2}$ The sulfate content was 54 g. per mol. In defining the mol weight, the bridging function of the sulfate group was not considered; the group —SO$_{4/2}$ is thus assumed to be an endblocking group. Smaller amounts of dekan were repeatedly added to the product. With a view to removing the water the product was subjected to distillation at 70° C. and 9 mm. Hg. A very visco mass with an acid value of 3.44·10$^{-3}$ val. Cl per gram substance was formed. 0.03 g. was part of the product. It follows that the amount of chlorine groups remaining in the product is so small so as to be negligible from a practical point of view. A product of the formula

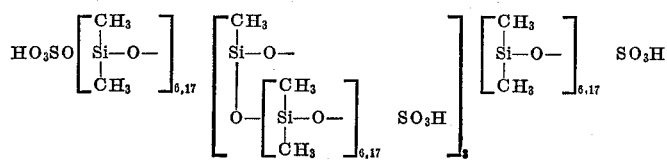

⇅

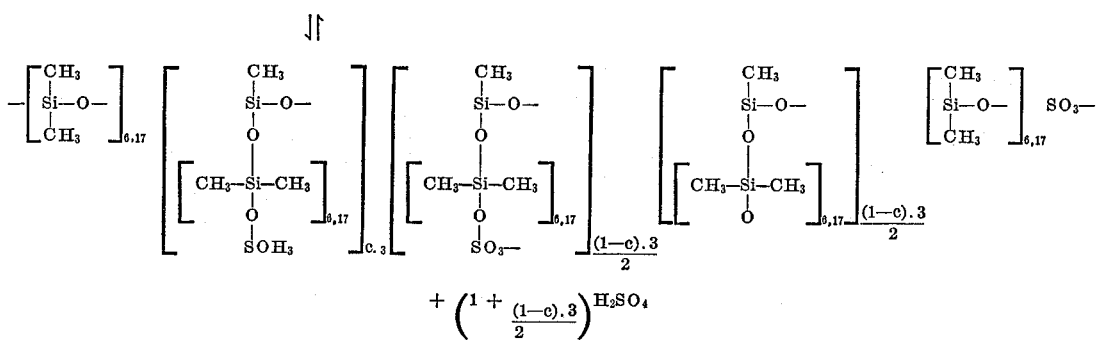

was obtained. This product has a theoretical acid value of 3.36·10$^{-3}$ val. acid per gram substance.

What is claimed is:

1. A process for preparing predominantly linear equilibrated organo-polysiloxane mixtures having terminal sulfuric acid groups of the general formula

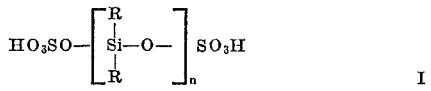 I wherein $n=2$ to 20 and R is hydrocarbon or hydrocarbon substituted by a group inert in respect to sulfuric acid, said mixtures being in equilibrium with sulfuric acid and with cyclic compounds of the general formula

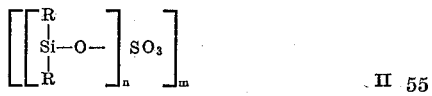 II wherein R has the above meaning and $m=1$ to 10, which comprises reacting organo-polysiloxanes having structural units of the general formula

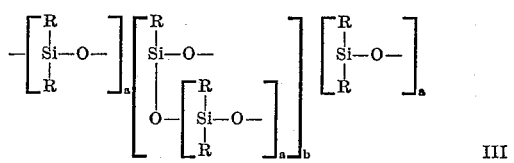 III wherein R stands for hydrocarbon or hydrocarbon substituted with a group inert to sulfuric acid and $b=0$ to 20, $a$ being 1 to 10$^5$, when $b=0$ and $a=1$ to 20, when $b \geq 1$, with H$_2$S$_2$O$_7$, the amount of H$_2$S$_2$O$_7$, calculated on siloxane linkages, being 10$^{-5}$ to 5×10$^{-1}$ mole.

2. A process as claimed in claim 1, wherein a portion of the R groups of Formula I is replaced by the group

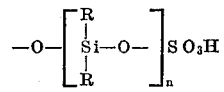

3. A process as claimed in claim 1, wherein the reaction is carried out at elevated temperatures not exceeding 150° C.

4. A process as claimed in claim 1, wherein said siloxane is added to said H$_2$S$_2$O$_7$.

5. A process for preparing predominantly linear equilibrated organo-polysiloxane mixtures having terminal sulfuric acid groups of the general formula

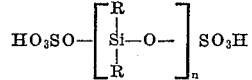 I wherein $n=2$ to 20 and R is hydrocarbon or hydrocarbon substituted by a group inert in respect to sulfuric acid, said mixtures being in equilibrium with sulfuric acid and with cyclic compounds of the general formula

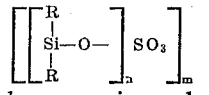 I wherein R has the above meaning and $m=1$ to 10, whichI comprises reacting organo-polysiloxanes having structural units of the general formula

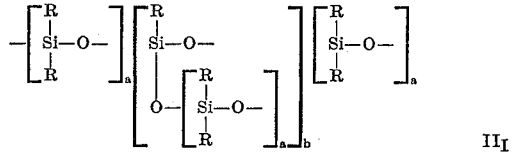 III$_1$ wherein R stands for hydrocarbon or hydrocarbon substituted with a group inert to sulfuric acid and $b=0$ to 20, $a$ being 1 to 10$^5$, when $b=0$ and $a=1$ to 20, when $b \geq 1$, with sulfuric acid, said sulfuric acid being used in an amount, calculated on siloxane linkages, of 10$^{-3}$ to 1 mole and removing the formed reaction water from the system.

6. A process as claimed in claim 5, wherein the reaction is carried out at elevated temperatures.

7. A process as claimed in claim 5, wherein the formed reaction water is azeotropically removed with low boiling inert solvents.

8. A process as claimed in claim 5, wherein said formed reaction water is removed in vacuo.

9. A process as claimed in claim 5, wherein said formed reaction water is removed by passing an inert gas flow through said reaction mixture.

10. A process as claimed in claim 5, wherein said siloxane is added to said sulfuric acid.

11. A process as claimed in claim 5, wherein a portion of the R groups of Formula I is replaced by the group

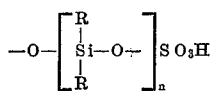

12. A process for preparing predominantly linear equilibrated organo-polysiloxane mixtures having terminal sulfuric acid groups of the general formula

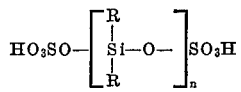  I wherein $n=2$ to 20 and R is hydrocarbon or hydrocarbon substituted by a group inert in respect to sulfuric acid, said mixtures being in equilibrium with sulfuric acid and with cyclic compounds of the general formula

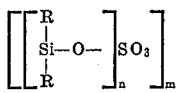  II wherein R has the above meaning and $m=1$ to 10, which comprises reacting organo-halogenpolysiloxanes of the general formula

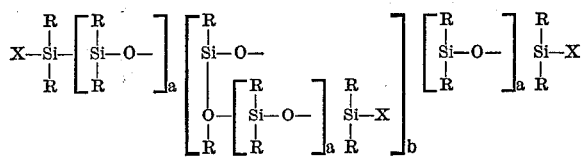

wherein R has the above meaning, X is halogen and $b=0$ to 20, $a$ being 1 to $10^5$ when $b=0$ and $a$ being 1 to 20 when $b \geq 1$, with sulfuric acid in quantities of 1 to 1.1 mole $H_2SO_4/SiX$ group.

13. A process as claimed in claim 12, wherein X is chlorine or bromine.

14. A process as claimed in claim 12, wherein X is chlorine or bromide, said organo-halopolysiloxane containing

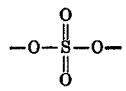

groups connecting two Si-atoms.

15. A process as claimed in claim 12, wherein said reaction is carried out at elevated temperatures up to 150° C.

16. A process as claimed in claim 12, wherein said sulfuric acid is added to said organo-halopolysiloxane.

17. A process as claimed in claim 12, wherein a portion of the R groups of Formula I is replaced by the group

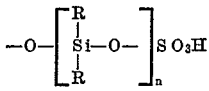

18. A process as claimed in claim 1, wherein the reaction product is reacted with dialkylcyclopolysiloxanes at temperatures not exceeding 150° C.

19. A process as claimed in claim 5, wherein the reaction product is reacted with dialkylcyclosiloxanes at temperatures not exceeding 150° C.

20. A process as claimed in claim 12, wherein the reaction product is reacted with dialkylcyclopolysiloxanes at temperatures not exceeding 150° C.

21. A process as claimed in claim 1, wherein the residual valences of the organo-polysiloxane of Formula III are intramolecularly saturated.

22. A process as claimed in claim 1, wherein the value of $a$ in the organo-polysiloxane of Formula III is 1.5 to 5 and $b=0$.

23. A process as claimed in claim 1, wherein said organo-polysiloxanes of Formula III are reacted with 0.5 to $5 \cdot 10^{-2}$ mole $H_2S_2O_7$, calculated on siloxane linkages.

24. A process as claimed in claim 1, wherein the reaction is carried out at temperatures of between 10 to 70° C.

25. A process as claimed in claim 7, wherein $CH_2Cl_2$ is used as low boiling solvent.

26. A process as claimed in claim 5, wherein the reaction is carried out at temperatures of about 20 to 70° C.

27. A process as claimed in claim 12, wherein the reaction is carried out at temperatures of about 20 to 100° C.

28. A process as claimed in claim 12, wherein the liberated hydrogen halide is removed from the reaction system by pressure reduction and/or by passing an inert gas through the reaction system.

29. A process as claimed in claim 18, wherein the reaction product is reacted with dimethylcyclopolysiloxane having 3 to 10 dimethylsiloxy units.

30. A process as claimed in claim 19, wherein the reaction product is reacted with dimethylcyclopolysiloxane having 3 to 10 dimethylsiloxy units.

31. A process as claimed in claim 20, wherein the reaction product is reacted with dimethylcyclopolysiloxane having 3 to 10 dimethylsiloxy units.

32. A process as claimed in claim 18, wherein the reaction product is reacted with dialkylcyclopolysiloxanes at temperatures of about 15 to 70° C.

33. A process as claimed in claim 19, wherein the reaction product is reacted with dialkylcyclopolysiloxanes at temperatures of about 15 to 70° C.

34. A process as claimed in claim 20, wherein the reaction product is reacted with dialkylcyclopolysiloxanes at temperatures of about 15 to 70° C.

35. Linear equilibrated organo-polysiloxane mixtures having terminal sulfuric acid groups of the general formula

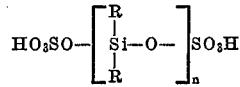

wherein $n=2$ to 20 and R is hydrocarbon.

36. A mixture as claimed in claim 35, wherein R is substituted by a group inert in respect to sulfuric acid.

37. A mixture as claimed in claim 35, wherein a portion of the R groups is replaced by the group

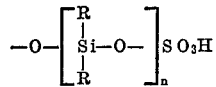

38. Mixtures as claimed in claim 35, wherein the R groups are the same or different hydrocarbons.

39. Mixtures as claimed in claim 35, wherein R is alkyl.

40. Mixtures as claimed in claim 35, wherein R is alkyl of the 1 to 6 carbon atoms.

41. Mixtures as claimed in claim 35, wherein R is methyl or ethyl.

42. Mixtures as claimed in claim 39, wherein a portion of the alkyl groups is replaced by aryl.

43. Mixtures as claimed in claim 42, wherein the aryl groups are phenyl.

44. Mixtures as claimed in claim 43, wherein the phenyl carries one or several —$SO_3H$ groups.

45. Mixtures as claimed in claim 39, wherein the alkyl groups are substituted with at least one of the following groups:

—(CH$_2$)$_3$OSO$_3$SiR$_3$; —(CH$_2$)$_3$OSO$_3$H; —(CH$_2$)$_3$SO$_3$H
—CH$_2$Br; —(CH$_2$)$_3$Cl; —(CH$_2$)$_2$OR; —(CH$_2$)$_x$R$_f$ (R$_f$=perfluoroalkyl; $x$=whole number);—(CH$_2$)$_2$OR$_f$.

46. Mixtures as claimed in claim 35, and being represented by the formula

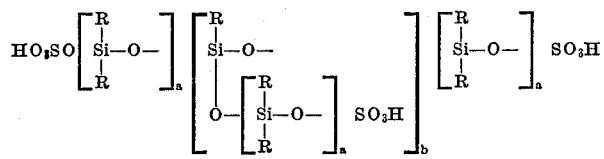

wherein $b$=0 to 20 and $a$=1 to $10^5$ when $b$=0 and $a$=1 to 20 and $b\geq 1$.

47. Mixtures as claimed in claim 46, wherein $a$=1 to 10.

48. Mixtures as claimed in claim 35, and being represented by the formula

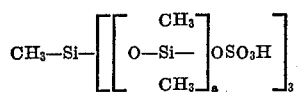

wherein $a$=1 to 20.

49. Mixtures as claimed in claim 48, when $a$=1 to 10.

50. Mixtures as claimed in claim 12. and being represented by the formula

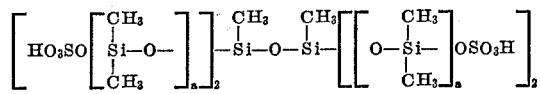

wherein $a$=1 to 20.

51. Mixtures as claimed in claim 50, wherein $a$=1 to 10.

52. A process as claimed in claim 1, wherein $m$=1 or 2.

53. A process as claimed in claim 5, wherein $m$=1 or 2.

54. A process as claimed in claim 12, wherein $m$=1 or 2.

55. A process as claimed in claim 2, wherein, in establishing the equilibrium condition, two of the groups

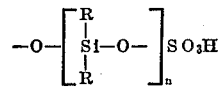

form the group

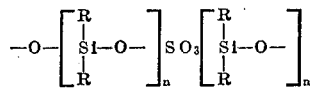

on that side which contains said Formula II compounds and the sulfuric acid.

56. A process as claimed in claim 11, wherein, in establishing the equilibrium condition, two of the groups

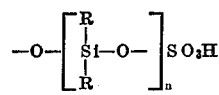

form the group

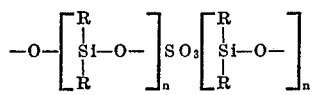

on that side which contains said Formula II compounds and the sulfuric acid.

57. A process as claimed in claim 17, wherein, in establishing the equilibrium condition, two of the groups

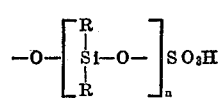

form the group

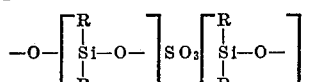

on that side which contains said Formula II compounds and the sulfuric acid.

58. A system of equilibrated organo-polysiloxane mixtures which are in equilibrium with sulfuric acid and cyclic organosilicon compounds, said system being represented by the equilibrium condition

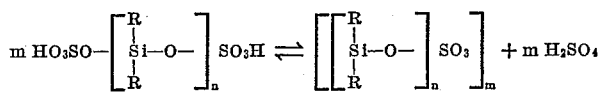

wherein $m$=1–10; $n$=2–20 and R is hydrocarbon or hydrocarbon substituted by a group inert to sulfuric acid.

59. A system as claimed in claim 58, wherein the equilibrium condition is represented by

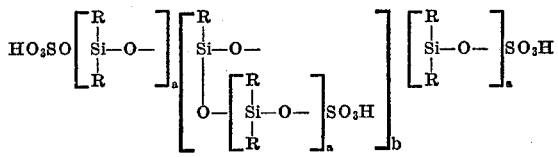

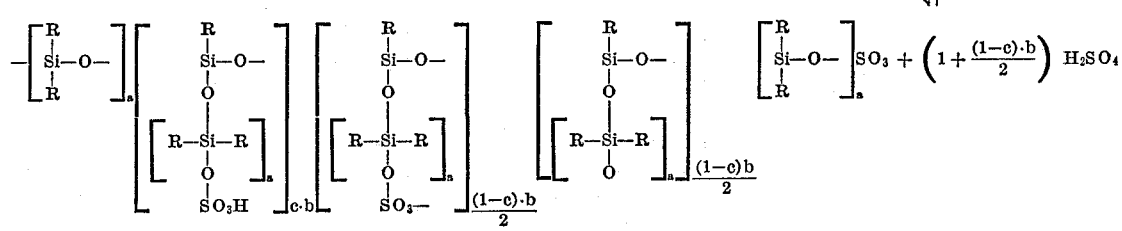

wherein $b$=0–20; $a$=1–10$_5$ when $b$=0 and $a$=1–20 when $b\geq 1$; $c$=0–1.

60. A system as claimed in claim 58, wherein the equilibrium is represented by
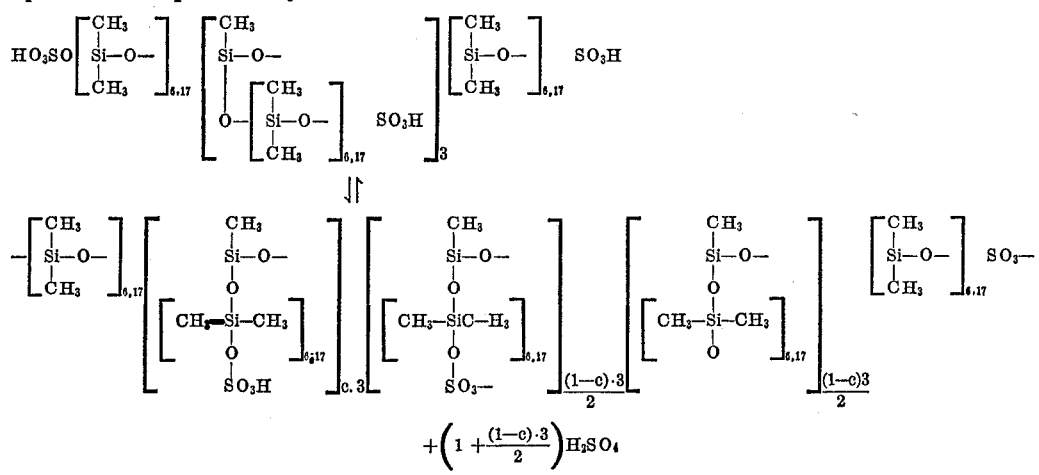
References Cited
UNITED STATES PATENTS
3,412,129  11/1968  Holdstock _____ 260—448.2 N
3,109,012  10/1963  Rossmy et al. ___ 260—448.2 N
DELBERT E. GANTZ, Primary Examiner
W. F. W. BELLAMY, Assistant Examiner
U.S. Cl. X.R.
117—135.1; 260—46.5E; 252—431, 440